United States Patent
Zhong et al.

(10) Patent No.: US 10,476,322 B2
(45) Date of Patent: Nov. 12, 2019

(54) ELECTRICAL MACHINE

(71) Applicant: ABB Schweiz AG, Zurich (CH)

(72) Inventors: Sheng Zhong, Hillsborough, NC (US); Lukasz Malinowski, Cracow (PL); Colin Tschida, Durham, NC (US); Dariusz Bednarowski, Cracow (PL); Charles Adam Fruits, Van Buren, AR (US); Douglas Sudhoff, Van Buren, AR (US); Darren Tremelling, Apex, NC (US)

(73) Assignee: ABB Schweiz AG, Baden (CH)

( * ) Notice: Subject to any disclaimer, the term of this patent is extended or adjusted under 35 U.S.C. 154(b) by 439 days.

(21) Appl. No.: 15/194,132

(22) Filed: Jun. 27, 2016

(65) Prior Publication Data

US 2017/0373545 A1 Dec. 28, 2017

(51) Int. Cl.
*H02K 1/18* (2006.01)
*H02K 5/16* (2006.01)
*H02K 5/15* (2006.01)
*H02K 5/22* (2006.01)
*H02K 5/02* (2006.01)
(Continued)

(52) U.S. Cl.
CPC .............. *H02K 1/185* (2013.01); *H02K 5/02* (2013.01); *H02K 5/08* (2013.01); *H02K 5/15* (2013.01); *H02K 5/16* (2013.01); *H02K 5/1732* (2013.01); *H02K 5/225* (2013.01)

(58) Field of Classification Search
CPC ............ H02K 1/185; H02K 5/02; H02K 5/15; H02K 5/16; H02K 5/225; H02K 5/08; H02K 5/1732

USPC ........................................................... 310/43
See application file for complete search history.

(56) References Cited

U.S. PATENT DOCUMENTS

| 4,682,065 A | 7/1987 | English et al. |
| 5,287,030 A * | 2/1994 | Nutter .................... F16C 33/20 |
| | | 310/407 |
| 5,584,114 A | 12/1996 | McManus |
| (Continued) | | |

FOREIGN PATENT DOCUMENTS

| CN | 201490798 U | 5/2010 |
| CN | 203660852 U | 6/2014 |
| (Continued) | | |

OTHER PUBLICATIONS

International Search Report and Written Opinion issued in corresponding international application No. PCT/US2017/039250, dated Sep. 6, 2017, 12 pp.
(Continued)

*Primary Examiner* — Alex W Mok
(74) *Attorney, Agent, or Firm* — Taft Stettinius & Hollister LLP; J. Bruce Schelkopf

(57) ABSTRACT

An electrical machine has a nonmetallic housing having a stator band and an endplate, wherein the laminated stator core is in self-locked engagement with the housing. Another electrical machine has a unitary nonmetallic housing with an integral stator band and an integral endplate, wherein the laminated stator core is over-molded with the housing. Yet another electrical machine has a unitary nonmetallic housing with an integral stator band and an integral endplate, wherein the laminated stator core is in engagement with the stator band with an interference fit.

9 Claims, 5 Drawing Sheets

(51) Int. Cl.
*H02K 5/08* (2006.01)
*H02K 5/173* (2006.01)

(56) References Cited

U.S. PATENT DOCUMENTS

| | | | | |
|---|---|---|---|---|
| 5,630,461 | A * | 5/1997 | Cochimin | B22C 9/046 |
| | | | | 164/34 |
| 5,687,927 | A * | 11/1997 | Beakes | H02K 15/095 |
| | | | | 242/432.6 |
| 5,731,646 | A | 3/1998 | Heinze et al. | |
| 6,007,006 | A * | 12/1999 | Engel | E03C 1/2665 |
| | | | | 241/46.014 |
| 6,663,362 | B1 | 12/2003 | Lentz et al. | |
| 6,995,489 | B2 * | 2/2006 | Ehrhart | H02K 1/148 |
| | | | | 310/156.27 |
| 7,036,206 | B2 | 5/2006 | Worden et al. | |
| 7,653,981 | B2 | 2/2010 | Fleytman | |
| 7,939,975 | B2 | 5/2011 | Saga et al. | |
| 7,963,469 | B2 * | 6/2011 | Hanson | E03C 1/2665 |
| | | | | 241/46.013 |
| D641,205 | S * | 7/2011 | Saeed | D7/375 |
| 8,040,005 | B2 | 10/2011 | Bhatti | |
| 8,186,975 | B2 * | 5/2012 | Kochan, Jr. | F04D 13/0666 |
| | | | | 310/268 |
| 9,222,246 | B2 * | 12/2015 | Vanassche | E03C 1/2665 |
| 2002/0104909 | A1 * | 8/2002 | Strutz | E03C 1/2665 |
| | | | | 241/46.013 |
| 2004/0104636 | A1 | 6/2004 | Ortt et al. | |
| 2006/0071567 | A1 | 4/2006 | Acosta | |
| 2007/0018523 | A1 * | 1/2007 | Ionel | H02K 21/16 |
| | | | | 310/156.47 |
| 2008/0086869 | A1 | 4/2008 | Acosta | |
| 2008/0219872 | A1 * | 9/2008 | Reinhart | F01C 21/003 |
| | | | | 418/55.5 |
| 2008/0229571 | A1 | 9/2008 | Acosta | |
| 2011/0171887 | A1 * | 7/2011 | Tanimoto | B24B 23/028 |
| | | | | 451/359 |
| 2011/0278966 | A1 | 11/2011 | Osborne et al. | |
| 2014/0139061 | A1 * | 5/2014 | Gutjahr | H02K 9/197 |
| | | | | 310/86 |
| 2014/0341759 | A1 * | 11/2014 | Calico | F04D 29/668 |
| | | | | 417/349 |
| 2014/0354381 | A1 * | 12/2014 | Kohlhafer | H01H 50/20 |
| | | | | 335/179 |
| 2015/0069873 | A1 | 3/2015 | Lam et al. | |

FOREIGN PATENT DOCUMENTS

| | | |
|---|---|---|
| WO | 2006039381 A2 | 4/2006 |
| WO | 2010135922 A1 | 12/2010 |
| WO | 2015043814 A2 | 4/2015 |

OTHER PUBLICATIONS

International Preliminary Report on Patentability issued in corresponding international application No. PCT/US2017/039250, dated Jan. 1, 2019, 6 pp.

* cited by examiner

ELECTRICAL MACHINE

TECHNICAL FIELD

The present application generally relates to electrical machines and more particularly, but not exclusively, to an electrical machine with a nonmetallic housing.

BACKGROUND

Electrical machines such as motors, generators and motor/generators and the like remain an area of interest. Some existing systems have various shortcomings, drawbacks and disadvantages relative to certain applications. For example, in some electrical machines, there is room for improvement in the housing, e.g., improved chemical resistance or resistance to fluid ingress. Accordingly, there remains a need for further contributions in this area of technology.

SUMMARY

One embodiment of the present invention is a unique electrical machine having a nonmetallic housing with a stator band and an endplate, wherein the laminated stator core is in self-locked engagement with the housing. Another embodiment is a unique electrical machine having a unitary nonmetallic housing with an integral stator band and an integral endplate, wherein the laminated stator core is overmolded with the housing. Yet another embodiment is a unique electrical machine having a unitary nonmetallic housing with an integral stator band and an integral endplate, wherein the laminated stator core is in engagement with the stator band with an interference fit. Other embodiments include apparatuses, systems, devices, hardware, methods, and combinations for electrical machines. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

Figure 1:
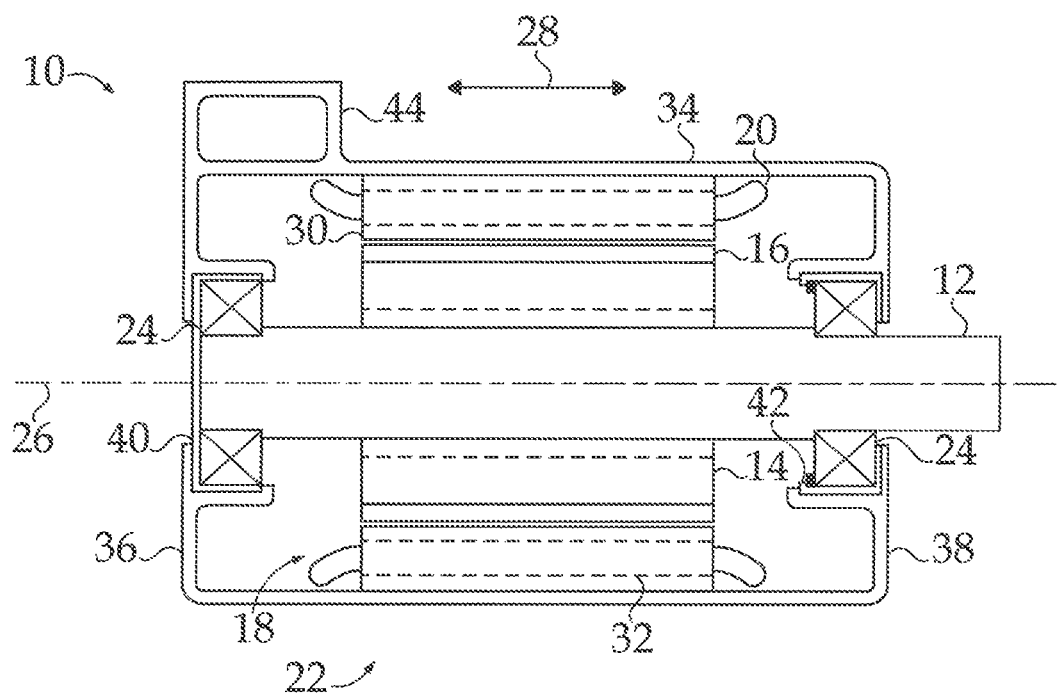
FIG. 1 schematically illustrates some aspects of a non-limiting example of an electrical machine in accordance with an embodiment of the present invention.
Figure 2:
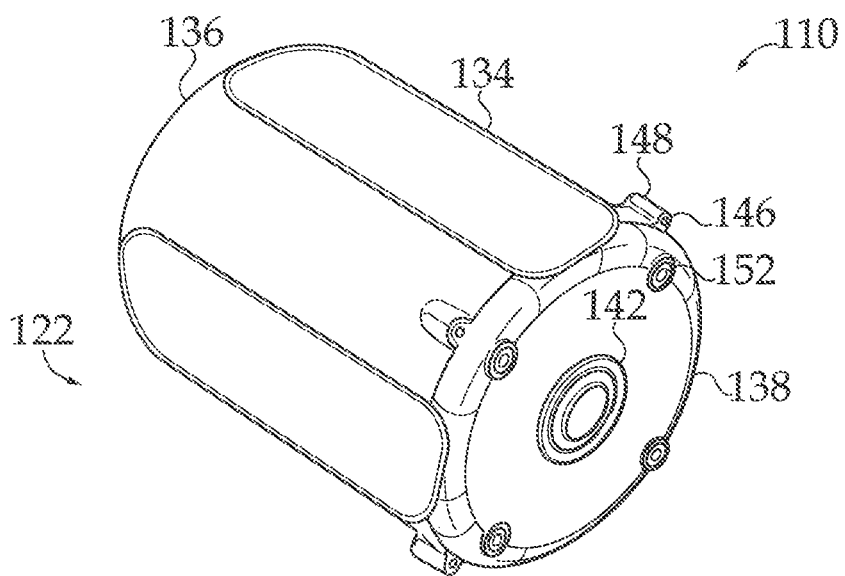
FIG. 2 schematically illustrates some aspects of a non-limiting example of an electrical machine in accordance with an embodiment of the present invention.
Figure 3:
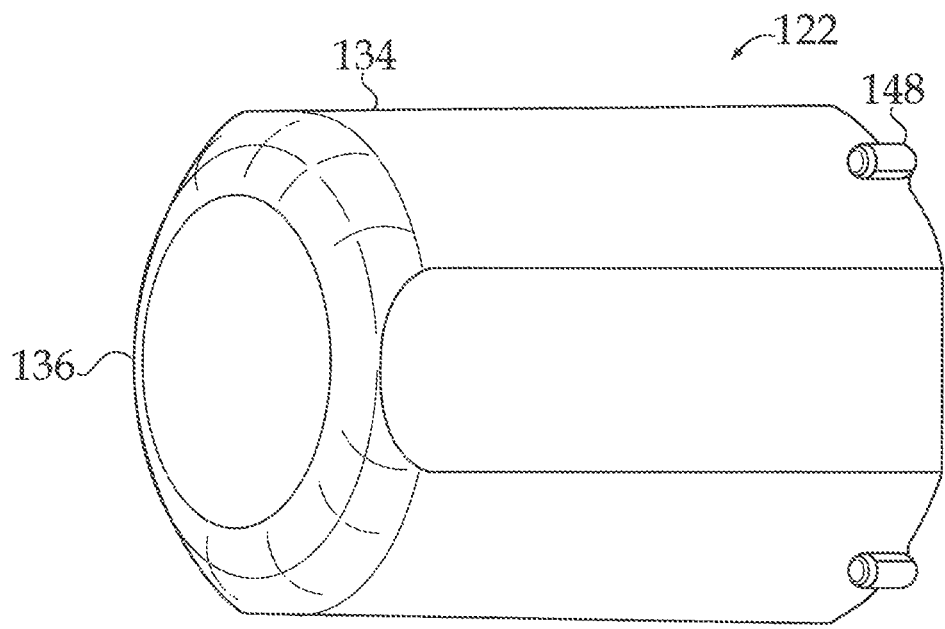
FIG. 3 schematically illustrates some aspects of a non-limiting example of a unitary housing of the electrical machine of FIG. 2 in accordance with an embodiment of the present invention.
Figure 4:
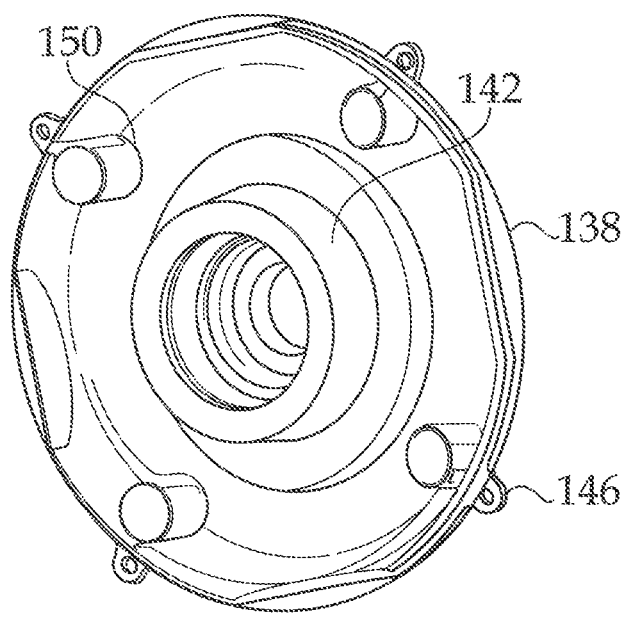
FIG. 4 schematically illustrates some aspects of a non-limiting example of a drive-end endplate of the electrical machine of FIG. 2 in accordance with an embodiment of the present invention.
Figure 5:
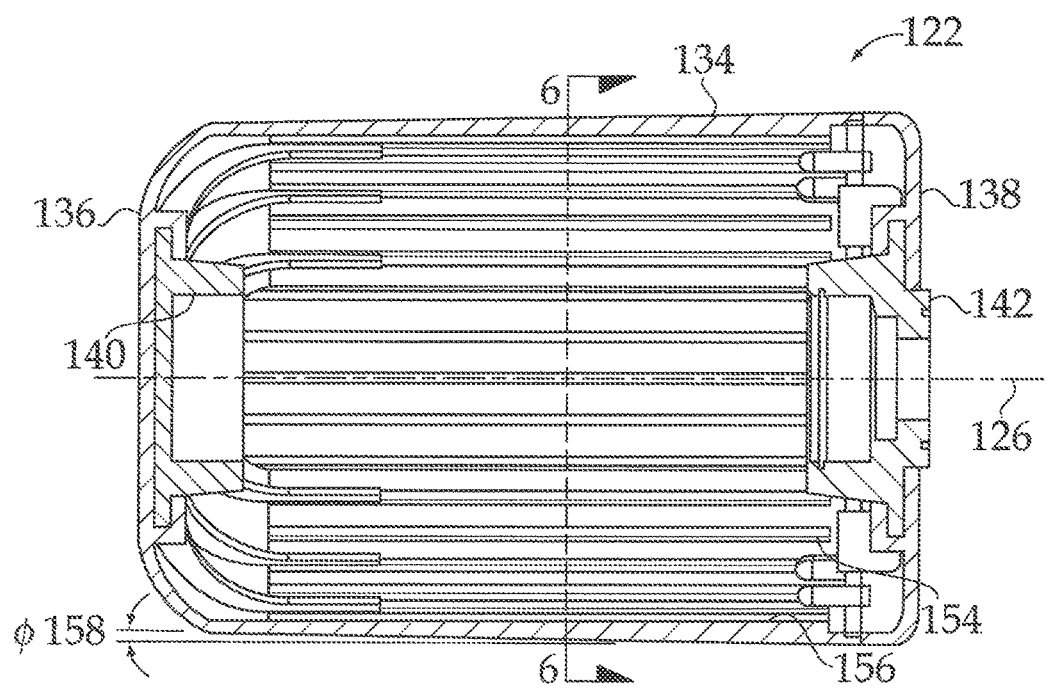
FIG. 5 schematically illustrates some aspects of a non-limiting example of a housing of the electrical machine of FIG. 2 in accordance with an embodiment of the present invention.
Figure 6:
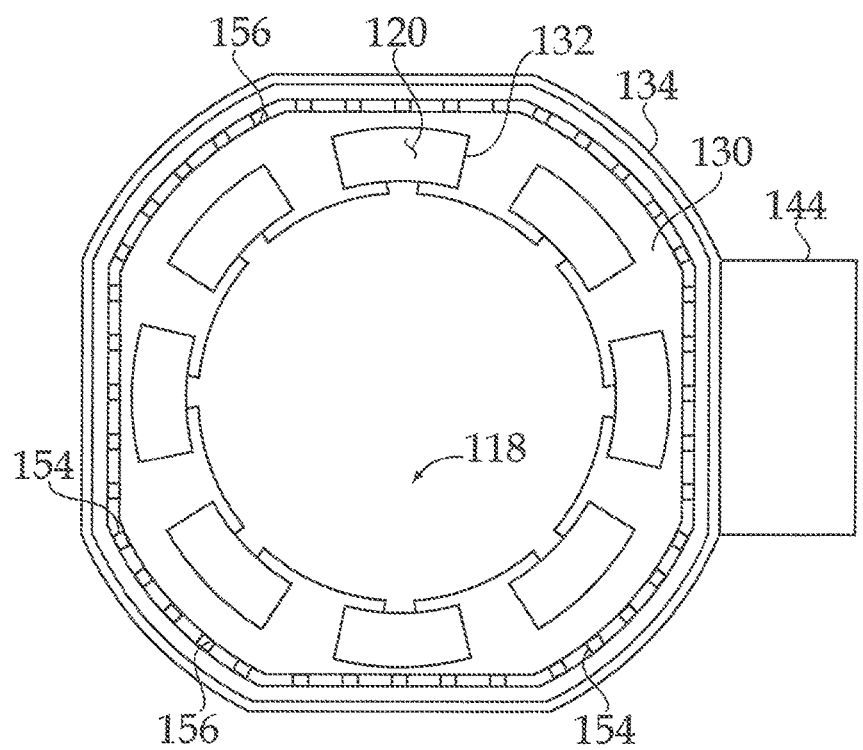
FIG. 6 schematically illustrates some aspects of a non-limiting example of the electrical machine of FIG. 2 in accordance with an embodiment of the present invention.
Figure 7:
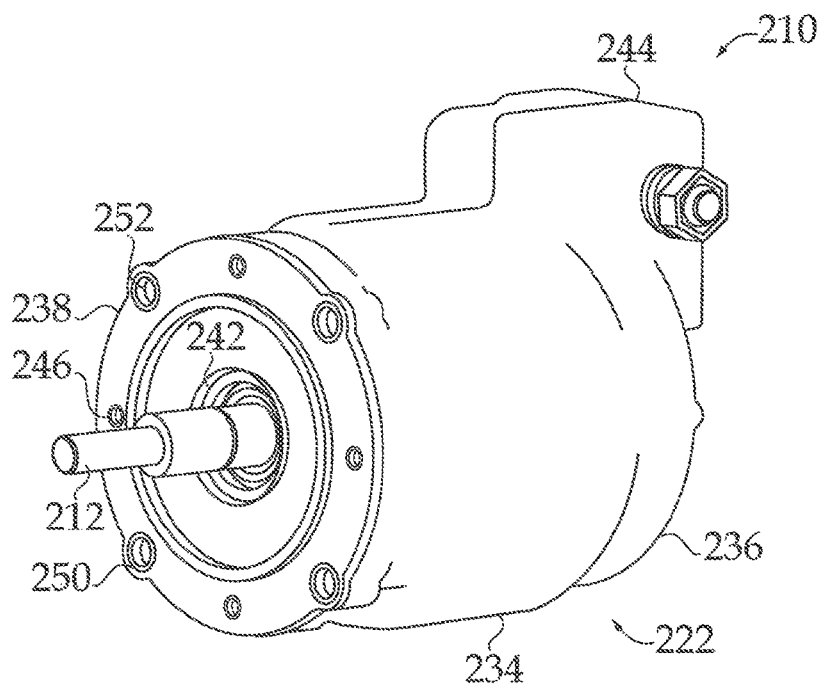
FIG. 7 schematically illustrates some aspects of a non-limiting example of an electrical machine in accordance with an embodiment of the present invention.
Figure 8:
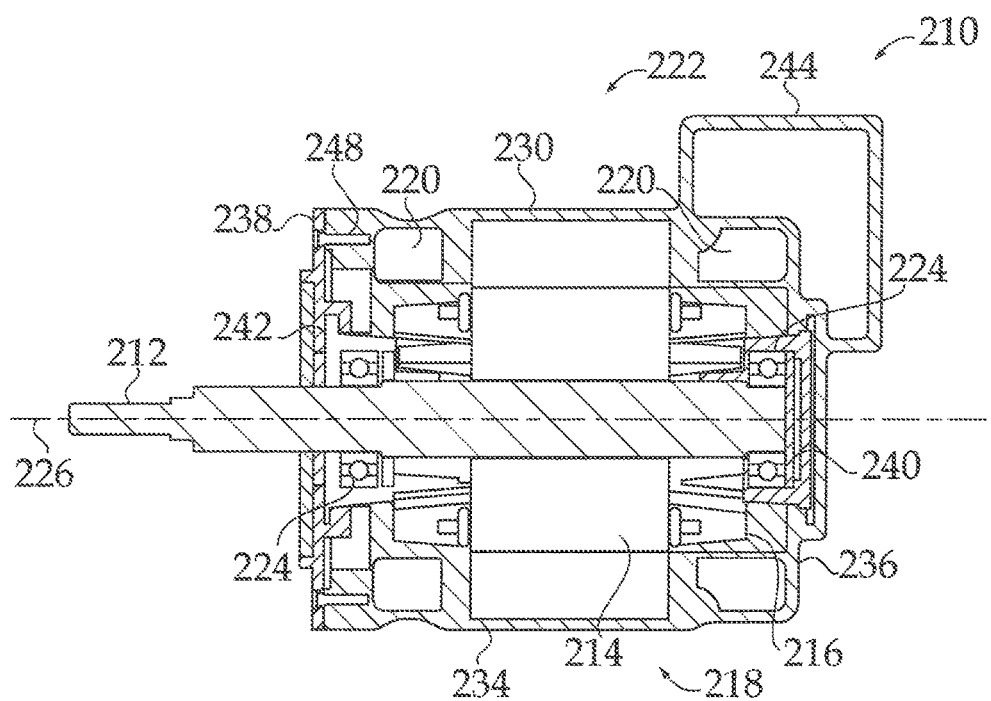
FIG. 8 schematically illustrates some aspects of a non-limiting example of the electrical machine of FIG. 7 in accordance with an embodiment of the present invention.
Figure 9:
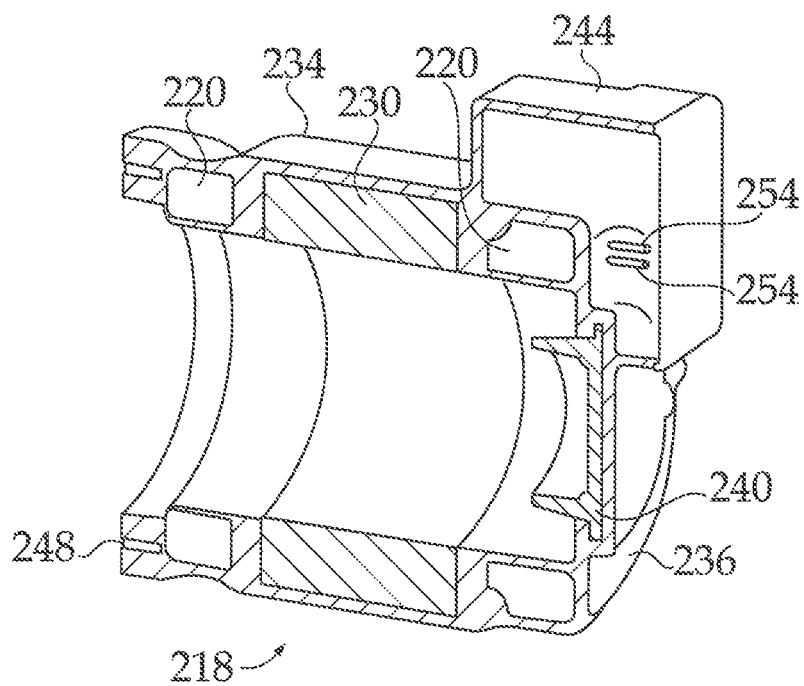
FIG. 9 schematically illustrates some aspects of a non-limiting example of a unitary housing of the electrical machine of FIG. 7 in accordance with an embodiment of the present invention.
Figure 10:
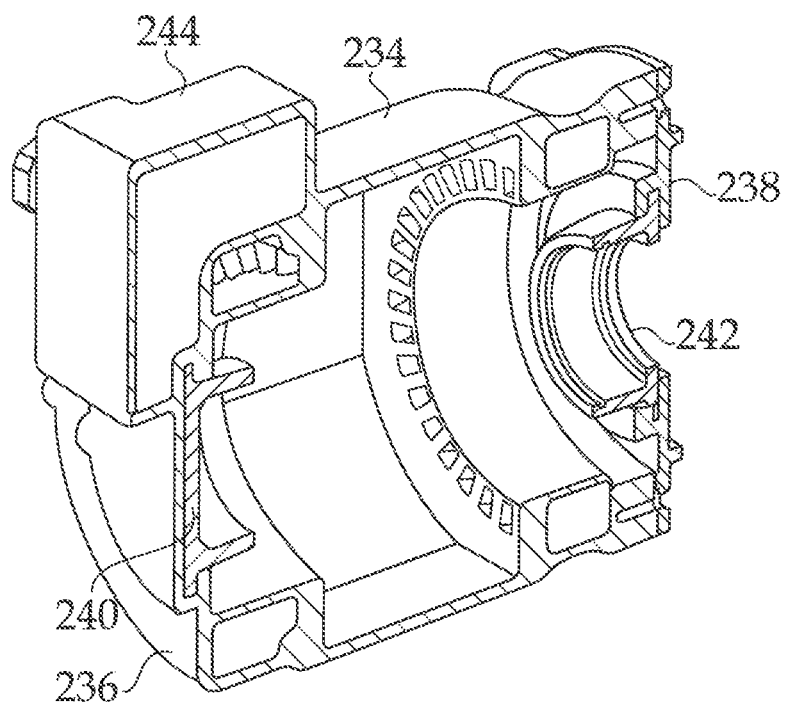
FIG. 10 schematically illustrates some aspects of a non-limiting example of a unitary housing of the electrical machine of FIG. 7 in accordance with an embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring to the drawings, and in particular FIG. 1, some aspects of a non-limiting example of an electrical machine 10 in accordance with an embodiment of the present invention are schematically depicted. In one form, electrical machine 10 is a permanent magnet motor. In other embodiments, electrical machine 10 may be a motor and/or a generator, and may be any type of electrical machine, such as a switched reluctance, synchronous reluctance, or permanent magnet assisted reluctance motor, a permanent magnet motor, or an induction motor or any other type of motor, generator or motor/generator. In various embodiments, electrical machine 10 may be a radial flux machine, an axial flux machine or a machine having a three-dimensional (3D) flux path. In one form, electrical machine 10 is an industrial electrical machine, e.g., an industrial motor. In other embodiments, electrical machine 10 may not be an industrial electrical machine. An industrial electrical machine is an electrical machine that is fixed in place, not handheld, and is used in industry for one or more of various industrial or other purposes, e.g., in industrial processes, in the fabrication of industrial or consumer chemicals, materials and goods, the provision of consumer and industrial services, manufacturing facilities, municipalities, material handling and other industry, and is not an electrical machine used in consumer products, such as tools used around the home and in home or home-like workshops, such as handheld or fixed electric drills, electric screwdrivers, electric saws and the like used in home and home-like workshops, home appliances, automobile accessory electrical machines, e.g., window motors, cabin heater or air conditioning fan motors or the like. Industrial electrical machines may operate in harsher environments, e.g., chemicals, solvents, contamination, etc., that consumer electrical machines are not subject to. An industrial electrical machine as that term is used herein includes electrical machines with power ratings up to about 5 hp, in some embodiments, and power ratings up to or in excess of about 25 hp in other embodiments. Electrical machine 10 includes a shaft 12, a rotor 14 having permanent magnets (poles) 16, a stator 18 having stator windings 20, a housing 22 and bearings 24. Shaft 12 and rotor 14 rotate about an axis of rotation 26, which defines an axial direction 28.

Shaft 12 is constructed to support rotor 14 and react radial and axial or thrust loads from rotor 14. In one form, shaft 12 is operative to transmit mechanical power from electrical machine 10 as an output of electrical machine 10. In other embodiments, shaft 12 may be operative to transmit mechanical power to and/or from electrical machine 10. Shaft 12 is axially and radially positioned by bearings 24. Shaft 12 and bearings 24 define axis of rotation 26 and corresponding axial direction 28.

Rotor 14 and stator 18 are in magnetic communication with each other. Each of rotor 14/poles 16 and stator 18 have a construction that is operative to direct magnetic flux toward and from each other. In some embodiments, rotor 14 may include other operative sources of magnetic flux, e.g., bus bars, windings or both, in conjunction with or in place of permanent magnets 16. In one form, permanent magnets 16 are surface mount ferrite magnets. In other embodiments, other configurations and/or compositions may be employed, e.g., including embedded configurations and/or rare earth magnet compositions.

Stator 18 includes a laminated stator core 30. Stator windings 20 are disposed within passages 32 in laminated stator core 30. In one form, stator windings 20 are copper conductors. In other embodiments, aluminum and/or other conductor materials may be employed in addition to or in place of copper. Windings 20 are constructed for magnetic communication with poles 16.

In one form, housing 22 is the external housing of electrical machine 10, separating the internal components of electrical machine 10 from the environment in which electrical machine 10 is installed. In other embodiments, housing 22 may be an intermediate housing, e.g., disposed within the housing structure that separates electrical machine 10 from the environment in which it is installed. In still other embodiments, housing 22 may define both an external and an intermediate or internal housing. In one form, housing 22 is nonmetallic. In a particular form, housing 22 is made of a polymer. In a more particular form, housing 22 is made of a thermoplastic. In other embodiments, housing 22 may be formed of one or more other materials. Preferably, the housing 22 material provides chemical resistance to wide range of chemicals and/or to particular chemicals for selected applications, strong mechanical performance, and thermal and environmental stability. Examples of materials that may be used to form housing 22 include one or more polymer composite materials, including but not limited to acetal and ketal based polymers and copolymers, polyesters (e.g. polyethylene terephthalate, polybutylene terephthalate), polycarbonate, polystyrene, polyether sulfone (PESU), polyphenylene sulfone (PPSU), polysulfone, and polytetrafluoroethylene (PTFE). Other polymers can also be implemented, including but not limited to polyvinyl chloride (PVC), polyethylene, polypropylene, polyetherimide (PEI), polyphenylene sulfide (PPS), polyether ether ketone (PEEK), polyphthalamide (PPA), polyoxymethylene (POM), phenolformaldehyd (PF), unsaturated polyester (UP), polyurethane (PUR and PU), polyimide, polyamide, polyvinyl alcohol, polyvinylidene chloride, polyacrylonitrile and polyalkylene paraoxybenzoate. In some embodiments, the composite can include a variety of types of fibers, including but not limited to carbon fiber, glass fiber, wool, silk, cotton, rayon, cellulose, cellulose acetate, flax, ramie, jute and aramid fibers. In some embodiments, additives can be used to improve the qualities of the materials, including but not limited to the mechanical and thermal stability, chemical resistance, insulation property and flammability. The additives can include, but are not limited to, ceramics, alumina, calcium silicate, flame retardants and clays.

Housing 22 is a unitary nonmetallic housing having an integral stator band 34 and an integral endplate 36 disposed at one end of stator band 34. In some embodiments, endplate 36 may not be integral, but rather, may be attached or affixed to stator band 34. A second endplate 38 is attached to housing 22 at the opposite end of stator band 34. In one form, endplate 36 is a non-drive end endplate, and endplate 38 is a drive-end endplate, or pulley endplate. In other embodiments, endplate 36 may be the drive-end endplate integral with stator band 34, and endplate 38 may be the non-drive end endplate. In some embodiments, housing 22 also includes an integral conduit box 44. In other embodiments, conduit box 44 may be attached, e.g., glued or welded or otherwise affixed or attached to stator band 34 and/or endplate 36 and/or endplate 38. Still other embodiments may not include a conduit box.

Over-molded with endplates 36 and 38 are respective sleeves 40 and 42. In one form, sleeves 40 and 42 are metallic. In one form, sleeves 40 and 42 are constructed to increase the stiffness of respective endplates 36 and 38, e.g., by virtue of having flanges, the diameter and thickness of which is configured to increase the stiffness of respective endplates 36 and 38. In addition, the axial length and/or other features of sleeves 40 and 42 may be configured to add stiffness to respective endplates 36 and 38. In other embodiments, sleeves 40 and/or 42 may not be constructed to increase the stiffness of the respective endplates. In some embodiments, sleeves 40 and/or 42 may be formed of the same material as respective endplates 36 and/or 38, and may be formed as part of the respective endplates 36 and/or 38. In other embodiments, one or both of sleeves 40 and 42 may be nonmetallic, and may be any suitable material. In one form, respective bearings 24 are mounted in bearing sleeves 40 and 42, which are operative to pilot the respective bearings 24. In other embodiments, sleeves 40 and 42 may form parts of the corresponding bearings 24, e.g., may be outer races or journals. The term, "over-molded" refers to a characteristic structural form wherein the components are said to be over-molded if one of the components encapsulates an other of the components to a degree that certain geometric features of the other component are encapsulated by or contained within or contained by certain geometric features of the one component, such that the components are locked to each other and cannot be removed from each other without damaging one or more of the over-molded components. As an example, sleeves 40 and 42 may be made to be over-molded with respective endplates 36 and 38 by forming retaining features on the sleeves, inserting the sleeves in a mold, and injecting material into the mold in an injection molding process to form the endplate, such that the endplate material flows around and encapsulates retaining features of the sleeve during the molding process, e.g., load-bearing features and/or other retention features. In other examples, over-molding may be achieved by injection molding; compression molding; potting, such as resin potting; welding (e.g., plastic or composite welding); adhering two or more other components together with an adhesive to encapsulate and effectively over-mold another part therein; 3-D printing; and/or other methods and processes that achieve an over-molded component as described herein.

Bearings 24 are constructed to react shaft 12 and rotor 14 axial or thrust loads in direction 28, and to react shaft 12 and rotor 14 radial loads perpendicular to axis of rotation 26.

Housing 22 is constructed to enclose stator 18 and react loads associated with stator 18, e.g., torque loads and any other loads generated due to magnetic interaction between stator 18 and rotor 14 during the operation of electrical machine 10. Housing 22 is also constructed to react thrust loads delivered through bearings 24.

Stator band 34 is in self-locked engagement with laminated stator core 30. By "self-locked engagement," it is meant that the components so described are locked together absent the use of separate or other intermediate components to attain the condition of being locked together, e.g., absent the use of screws, bolts, retaining rings, clamps, or the like, and are not free to displace in any direction relative to each other, other than by such phenomena as mechanical stress/strain and/or relative thermal expansion or contraction, and in some situations, hygroscopic expansion and/or contraction. Self-locked engagement may be achieved in various manners. For example, self-locked engagement may be achieved where two or more components are over-molded together, or by employing an interference or press fit between two or more components to achieve self-locked engagement of the components.

In some embodiments, laminated stator core 30 is over-molded with stator band 34 using an injection molding process. In such embodiments, stator windings 20 may also be over-molded with stator band 34. In some such embodiments, winding leads from stator windings 20 may be over-molded with stator band 34 and/or endplate 36 and/or conduit box 44. In some embodiments, laminated stator core 30 is in engagement with the stator band 34 with an interference fit, i.e., stator core 30 is engaged with stator band 34 with a press fit. In some such embodiments, stator band 34 may include a plurality of ribs in engagement with laminated stator core 30. Housing 22 may be constructed to contain or house laminated stator cores 34 with different stack lengths, e.g., so that the electrical machines 10 with different power or duty cycle ratings may employ the same housing 22.

Referring to FIGS. 2-6, some aspects of a non-limiting example of an electrical machine 110 in accordance with an embodiment of the present invention are schematically illustrated. In one form, electrical machine 110 is an industrial electrical machine. The description of like components and relationships therebetween in electrical machine 10 applies equally to electrical machine 110, except where otherwise indicated. In various embodiments, electrical machine 110 may be any electrical machine, e.g., as described above with respect to electrical machine 10. Electrical machine 110 includes a shaft and rotor with windings, magnets and/or bus bars (not shown), a stator 118 having stator windings 120, a housing 122 and bearings (not shown). Stator 118 includes a laminated stator core 130 with passages 132 extending therethrough, in which stator windings 120 are disposed. Stator core 130, stator windings 120 and passages 132 are filled with and encapsulated by potting, e.g., epoxy resin, which in some embodiments increases the stiffness of housing 122. Housing 122 is a unitary nonmetallic housing having an integral stator band 134, an integral endplate 136, an integral conduit box 144 and an attached endplate 138 similar to that described above with respect to housing 22, endplate 36, endplate 38 and conduit box 44. In the depicted embodiment, endplate 136 is a non-drive end endplate. Endplate 138 in the illustrated embodiment is a drive-end endplate. Bearing sleeves 140 and 142 are over-molded with respective endplates 136 and 138.

Endplate 138 is attached to stator band 134, e.g., via fasteners engaging mounting ears 146 with bosses 148. In other embodiments, other joining methods may be employed, e.g., bonding or welding. Electrical machine 110 may be mounted to other equipment, e.g., equipment powered by electrical machine 110, via bosses 150 having inserts 152 in endplate 138, such as threaded inserts. The threaded inserts may be over-molded with endplate 138 in some embodiments. In other embodiments, other methods may be used to attach the threaded inserts, e.g., ultrasonic welding. In other embodiments, endplate 136, endplate 138 and/or stator band 134 may include footing for mounting electrical machine 110, which in some embodiments may be integral with housing 122.

Laminated stator core 130 is in engagement with the stator band 134 with an interference fit, i.e., stator core 130 is engaged with stator band 134 with a press fit. Stator band 134 includes a plurality of ribs 154 in engagement with laminated stator core 130. The interference fit engagement between stator band 134 and stator core 134 occurs along the length of mating surfaces 156 of ribs 154. In some embodiments, the exterior surface of stator band 134 is disposed or tapered at a draft angle Ø158, e.g., relative to a line parallel to centerline 126. Draft angle Ø158 may be, for example, 0.5°-2° in some embodiments. In other embodiments, draft angle Ø158 may vary with the needs of the particular application, and may be, for example, in the range of 0.1°-10°. In some embodiments, the interior surface of stator band is also disposed or tapered at a draft angle, which in some embodiments is the same magnitude as angle Ø158. In such embodiments, mating surfaces 156 of ribs are disposed at an angle relative to the inner and/or outer surface of stator band 134 so as to be parallel to centerline 126 and provide regular radial contact with laminated stator core 130 along the length of the stator core 130.

Housing 122 is constructed to contain or house laminated stator cores 130 with different stack lengths, e.g., so that electrical machines 110 with different power or duty cycle ratings may employ the same housing 122. In the illustrated embodiment, the overall length of housing 122 is 245 millimeters. In other embodiments, the overall length of housing 122 may vary with the needs of the application.

The assembly of electrical machine 110 includes mechanically pressing stator core 130/stator 118 into housing 122, inserting the rotor and shaft, and assembling endplate 138. In some embodiments, housing 122 may be heated to a suitable temperature, e.g., 100° C., before pressing stator core 130/stator 118 into housing 122. Endplate 138 is then attached using a suitable joining method, e.g., using screws to attach ears 146 to bosses 148.

Referring to FIGS. 7-10, some aspects of a non-limiting example of an electrical machine 210 in accordance with an embodiment of the present invention are schematically illustrated. In one form, electrical machine 210 is an industrial electrical machine. The description of like components and relationships therebetween in electrical machine 10 applies equally to electrical machine 210, except where otherwise indicated. In various embodiments, electrical machine 210 may be any electrical machine, e.g., an electrical machine as described above with respect to electrical machine 10. Electrical machine 210 includes a shaft 212, a rotor 214 with windings, magnets and/or bus bars 216, a stator 218 having stator windings 220, a housing 222 and bearings 224. Stator 218 includes a laminated stator core 230 with passages 232 extending therethrough, in which stator windings 220 are disposed.

Housing 222 is a unitary nonmetallic housing having an integral stator band 234, an integral endplate 236, an integral conduit box 244 and an attached endplate 238 similar to that described above with respect to housing 22, endplate 36, endplate 38 and conduit box 144. In the depicted embodiment, endplate 236 is a non-drive end endplate, and endplate 238 is a drive-end endplate. Bearing sleeves 240 and 242 are over-molded with respective endplates 236 and 238.

Endplate 238 is attached to stator band 234, e.g., via fasteners engaging through openings 246 in endplate 238 with corresponding openings 248 in stator band 234. In other embodiments, other joining methods may be employed, e.g., bonding or welding. Electrical machine 210 may be mounted to other equipment, e.g., equipment powered by electrical machine 210, via openings 250 in endplate 238 and openings having inserts 252 in stator band 234, such as threaded inserts. In other embodiments, endplate 236, endplate 238 and/or stator band 234 may include footing for mounting electrical machine 210, which in some embodiments may be integral with housing 222. Inserts 252 may be over-molded with stator band 234 in some embodiments. In other embodiments, other methods may be used to attach the inserts, e.g., ultrasonic welding.

Laminated stator core 230 is over-molded with stator band 234. In addition, windings 220 are over-molded with stator band 234. Also, winding leads 254 (shown in part) that extend from and are in electrical communication with windings 220 are over-molded with stator band 234 and conduit box 244. In some embodiments, winding leads 254 may also or alternatively be over-molded with endplate 236. Stator windings 220 and laminated stator core 230 are employed as housing 222 structural components, which in some embodiments reduces the amount of materials needed to obtain a desired stiffness of housing 222.

In the illustrated embodiment, the overall length of housing 222 is 180 millimeters for a stator stack length of 80 millimeters. In other embodiments, the overall length of housing 222 and the stator stack length may vary with the needs of the application.

A non-limiting example of the production of electrical machine 210 includes placing an insert is placed in stator 218 to prevent the housing 222 material from filling up the interior of stator 218, and also to align stator 218 with sleeve 240. Sleeve 240 and stator 218 (including windings and winding leads) with the insert are then placed in the mold. An insert to protect the leads may also be employed. The mold is then closed, and housing 222 (including stator band 234, endplate 236 and conduit box 244) is molded, including over-molding stator 218 with stator band 234, and over-molding sleeve 240 with endplate 236, enclosing the laminated stator core, windings and winding leads. After removing housing 222 from the mold, a bearing 224, shaft 212 and rotor 214 are inserted into housing 222 A bearing 224 is installed into endplate 238, and endplate 238 is attached to stator band 234 using a suitable joining method, e.g., using screws to engage openings 248 via openings 246 in endplate 238.

Embodiments of the present invention include an electrical machine, comprising: a stator having a laminated stator core and a plurality of windings; and a nonmetallic housing having a stator band and at least one endplate, wherein the laminated stator core is in self-locked engagement with the housing.

In a refinement, the electrical machine is configured as an industrial electrical machine.

In another refinement, the electrical machine further comprises a bearing sleeve, wherein the bearing sleeve is over-molded with the endplate.

In yet another refinement, the housing further includes an integral conduit box.

In still another refinement, the housing is a unitary housing, and the stator band and the endplate are integral with the unitary housing.

In yet still another refinement, the nonmetallic housing is an external housing of the electrical machine.

In a further refinement, the nonmetallic housing is formed of a material including fibers in a composite material.

Embodiments of the present invention include an electrical machine, comprising: a stator having a laminated stator core and a plurality of windings; and a unitary nonmetallic housing having an integral stator band and an integral endplate, wherein the laminated stator core is over-molded with the housing.

In a refinement, the plurality of windings are over-molded with the housing.

In another refinement, the electrical machine further comprises a plurality of winding leads in communication with the plurality of windings, wherein the plurality of winding leads are over-molded with the stator band and/or the endplate.

In yet another refinement, the electrical machine further comprises a drive-end endplate affixed to the stator band.

In still another refinement, the electrical machine further comprises a bearing sleeve, wherein the bearing sleeve is over-molded with the drive-end endplate.

In yet still another refinement, the unitary nonmetallic housing further includes an integral conduit box.

Embodiments of the present invention include an electrical machine, comprising: a stator having a laminated stator core and a plurality of windings; and a unitary nonmetallic housing having an integral stator band and an integral endplate, wherein the laminated stator core is in engagement with the stator band with an interference fit.

In a refinement, the unitary nonmetallic housing includes a plurality of ribs in engagement with the laminated stator core.

In another refinement, the ribs include a mating surface in engagement with the laminated stator core, and wherein the mating surface is disposed at an angle relative to the inner surface and/or the outer surface of the stator band.

In yet another refinement, the electrical machine further comprises a bearing sleeve, wherein the bearing sleeve is over-molded with the endplate.

In still another refinement, the laminated stator core and the windings are filled with and encapsulated by potting.

In yet still another refinement, the unitary nonmetallic housing further includes an integral conduit box.

In a further refinement, the unitary nonmetallic housing is constructed to house laminated stator cores with different stack lengths.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An electrical machine, comprising: a stator including a laminated stator core and a plurality of windings; and a nonmetallic housing including a stator band and at least one endplate, wherein the laminated stator core is in self-locked engagement with the housing; and
wherein the housing is a unitary housing, wherein the stator band and the at least one endplate are nonmetallic and integral with the unitary housing and molded from a polymeric material to form the unitary housing with the stator band and the at least one endplate as a singular one-piece continuous polymeric construction formed of the polymeric material, wherein the electrical machine is configured as an industrial electrical machine, and wherein the unitary housing is an external housing of the electrical machine, further comprising:
a bearing sleeve, wherein the bearing sleeve is over-molded with the at least one endplate and disposed adjacent to a first end of the stator;
a first bearing supported by the bearing sleeve at the at least one endplate;
a second bearing disposed adjacent to a second end of the stator opposite the first end; and
a rotor having a central portion disposed inside the stator, wherein the rotor is supported on one end by the first bearing and supported on the opposite end by the second bearing.

2. The electrical machine of claim 1, wherein the housing further includes an integral conduit box.

3. The electrical machine of claim 1, wherein the nonmetallic housing is formed of a material including fibers in a composite material.

4. An electrical machine, comprising: a stator including a laminated stator core and a plurality of windings; and a unitary nonmetallic housing having an integral stator band and an integral endplate, wherein the laminated stator core is over-molded with the housing; wherein the electrical machine is configured as an industrial electrical machine; and wherein the plurality of windings are over-molded with the housing, further comprising:
a plurality of winding leads in communication with the plurality of windings, wherein the plurality of winding leads are over-molded with the stator band and/or the endplate;
a drive-end endplate affixed to the stator band; and
a bearing sleeve, wherein the bearing sleeve is over-molded with the drive-end endplate, wherein the integral endplate is disposed at a first end of the electrical machine; wherein the drive-end endplate is disposed at a second end of the electrical machine opposite the first end; and wherein the stator is disposed between the integral endplate and the drive-end endplate, further comprising:
a first bearing supported by the bearing sleeve at the drive-end endplate;
a second bearing supported at the integral endplate; and
a rotor having a central portion disposed inside the stator, wherein the rotor is supported on one end by the first bearing and supported on the opposite end by the second bearing.

5. The electrical machine of claim 4, wherein the unitary nonmetallic housing further includes an integral conduit box.

6. An electrical machine, comprising: a stator including a laminated stator core and a plurality of windings; and a unitary nonmetallic housing having an integral nonmetallic stator band and an integral nonmetallic endplate molded from a polymeric material to form the unitary nonmetallic housing with the stator band and the endplate as a singular one-piece continuous polymeric construction formed of the polymeric material, wherein the laminated stator core is in engagement with the stator band with an interference fit, wherein the electrical machine is configured as an industrial electrical machine, wherein the unitary nonmetallic housing includes a plurality of ribs in engagement with the laminated stator core, and wherein the ribs include a mating surface in engagement with the laminated stator core, and wherein the mating surface is disposed at an angle relative to the inner surface and/or the outer surface of the stator band, further comprising a bearing sleeve, wherein the bearing sleeve is over-molded with the endplate and disposed adjacent to a first end of the stator, further comprising:
a first bearing supported by the bearing sleeve at the at least one endplate;
a second bearing disposed adjacent to a second end of the stator opposite the first end; and
a rotor having a central portion disposed inside the stator, wherein the rotor is supported on one end by the first bearing and supported on the opposite end by the second bearing.

7. The electrical machine of claim 6, wherein the laminated stator core and the windings are filled with and encapsulated by potting.

8. The electrical machine of claim 6, wherein the unitary nonmetallic housing further includes an integral conduit box.

9. The electrical machine of claim 6, wherein the unitary nonmetallic housing is constructed to house laminated stator cores with different stack lengths.

* * * * *